(12) United States Patent
Nishikori

(10) Patent No.: US 10,394,337 B2
(45) Date of Patent: Aug. 27, 2019

(54) PARAMETER SETTING APPARATUS, AUDIO SIGNAL PROCESSING APPARATUS, PARAMETER SETTING METHOD AND STORAGE MEDIUM

(71) Applicant: Yamaha Corporation, Hamamatsu-shi, Shizuoka-ken (JP)

(72) Inventor: Taku Nishikori, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 721 days.

(21) Appl. No.: 14/943,991

(22) Filed: Nov. 17, 2015

(65) Prior Publication Data

US 2016/0139788 A1    May 19, 2016

(30) Foreign Application Priority Data

Nov. 17, 2014   (JP) .................................. 2014-233171

(51) Int. Cl.
*G06F 3/02* (2006.01)
*G06F 3/16* (2006.01)
(Continued)

(52) U.S. Cl.
CPC .............. *G06F 3/02* (2013.01); *G06F 3/0484* (2013.01); *G06F 3/04847* (2013.01);
(Continued)

(58) Field of Classification Search
CPC .......... G06F 3/02; G06F 3/0227; G06F 3/038; G06F 3/04847; G06F 3/0481;
(Continued)

(56) References Cited

U.S. PATENT DOCUMENTS

| | | | | |
|---|---|---|---|---|
| 7,441,193 | B1 * | 10/2008 | Wild ..................... | G06F 3/0213 |
| | | | | 345/173 |
| 8,073,159 | B2 * | 12/2011 | Ando ..................... | H04H 60/04 |
| | | | | 369/4 |

(Continued)

FOREIGN PATENT DOCUMENTS

| | | |
|---|---|---|
| JP | 2007-281687 A | 10/2007 |
| JP | 2010-232855 A | 10/2010 |
| JP | 2013-162175 A | 8/2013 |

OTHER PUBLICATIONS

Steinberg. (2010). "USB Audio Interface CI2+," Operation Manual, Yamaha Corporation, <http://www.steinberg.net>, 32 pages.

(Continued)

*Primary Examiner* — Nicholas Ulrich
(74) *Attorney, Agent, or Firm* — Morrison & Foerster LLP

(57) ABSTRACT

A parameter setting apparatus includes: a real control adapted to detect value modification operation for modifying a value of a parameter; and a display device adapted to detect touch operation and displaying virtual controls corresponding to a plurality of parameters respectively. In an unlock state, an assigner assigns a parameter corresponding to a touched virtual control to the real control, and in a lock state, the assigner does not change the assignment of the parameter even if detecting a touch operation. In response to the value modification operation of the real control, the parameter setting apparatus modifies the value of the parameter assigned to the real control if the operation is performed during the touch operation, or the value of the parameter corresponding to the touched virtual control if the operation is performed during the touch operation.

12 Claims, 6 Drawing Sheets

(51) Int. Cl.
*G11B 27/34* (2006.01)
*H04H 60/04* (2008.01)
*G06F 3/0484* (2013.01)
*G06F 3/0488* (2013.01)

(52) U.S. Cl.
CPC ...... *G06F 3/04883* (2013.01); *G06F 3/04886* (2013.01); *G06F 3/165* (2013.01); *G11B 27/34* (2013.01); *H04H 60/04* (2013.01)

(58) Field of Classification Search
CPC ...... G06F 3/0489; G06F 3/048; G06F 3/0484; H04H 60/04; B60K 2350/1016
See application file for complete search history.

(56) References Cited

U.S. PATENT DOCUMENTS

| | | | | |
|---|---|---|---|---|
| 2006/0220929 | A1* | 10/2006 | Aiso | G06F 3/0362 341/50 |
| 2007/0052687 | A1* | 3/2007 | Terada | G06F 3/04847 345/173 |
| 2010/0194677 | A1* | 8/2010 | Fiebrink | G06F 3/04847 345/156 |
| 2010/0246856 | A1 | 9/2010 | Suzuki | |
| 2010/0266147 | A1* | 10/2010 | Radford | H04H 60/04 381/119 |
| 2011/0069025 | A1 | 3/2011 | Fujita et al. | |
| 2011/0130200 | A1 | 6/2011 | Terada et al. | |
| 2012/0233545 | A1* | 9/2012 | Ikeda | G06F 3/0488 715/702 |
| 2013/0219336 | A1* | 8/2013 | Klepper | G06F 3/04847 715/810 |
| 2014/0320406 | A1* | 10/2014 | Nishizawa | G06F 3/016 345/157 |

OTHER PUBLICATIONS

Yamaha. (2014). "Digital Mixing Console," QL5/QL1 Owner's Manual, Yamaha Manual Library, http:/www.yamaha.co.jp/manual/, 58 pages.

Extended European Search Report dated Apr. 26, 2016, for EP Application No. 15194222.4, eleven pages.

Yamaha. (Dec. 31, 2013). "Yamaha Digital Mixing Console, CL5 CL3 CL1," Owner's Manual, Japan, retrieved from: <http://download.yamaha.com/api/asset/file?lanauage=en&site=countrysite-master.prod.wsys.yamaha.com&asset_id=59026>, retrieved on Apr. 8, 2016, 66 pages.

Notification of Reasons for Refusal dated Oct. 3, 2016, for JP Application No. 2014-233171, with English translation, five pages.

* cited by examiner

{Fig. 1}
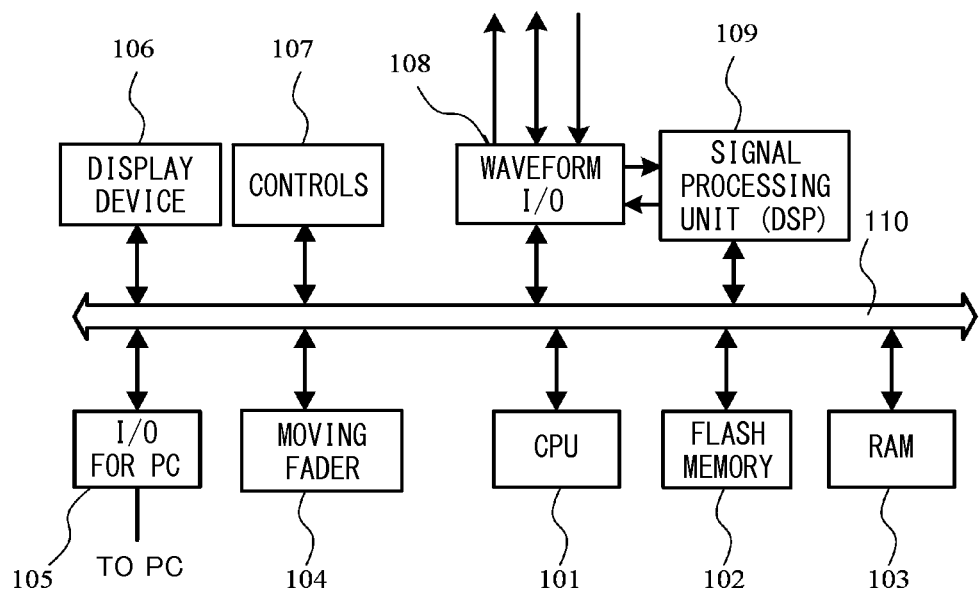
{Fig. 2}
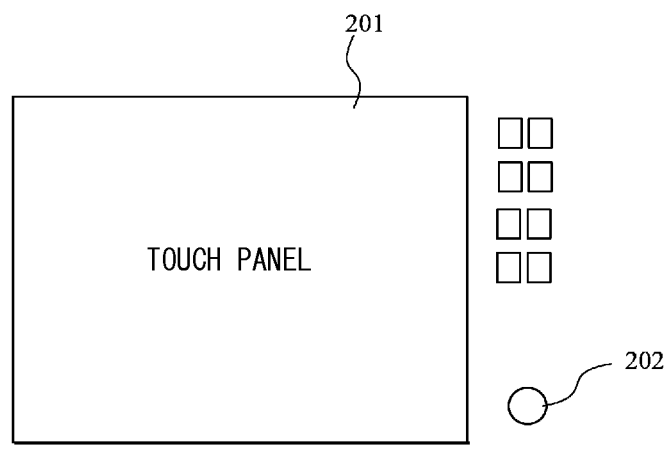

{Fig.3}
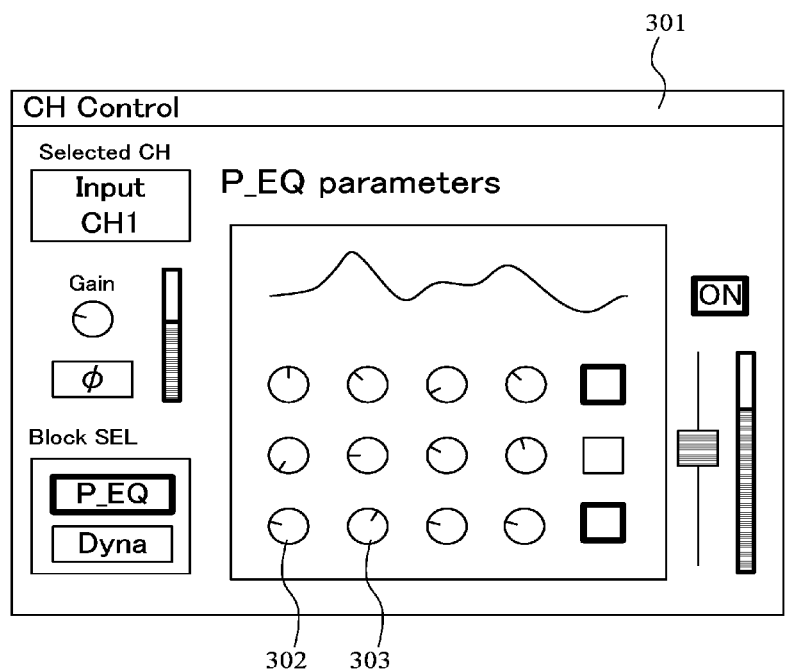

{Fig. 4A}
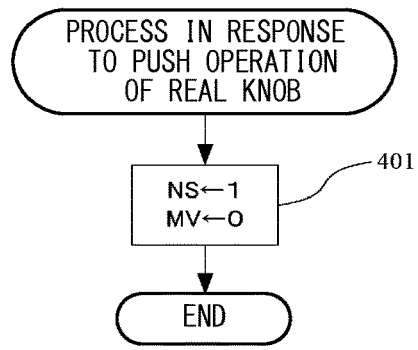
{Fig. 4B}
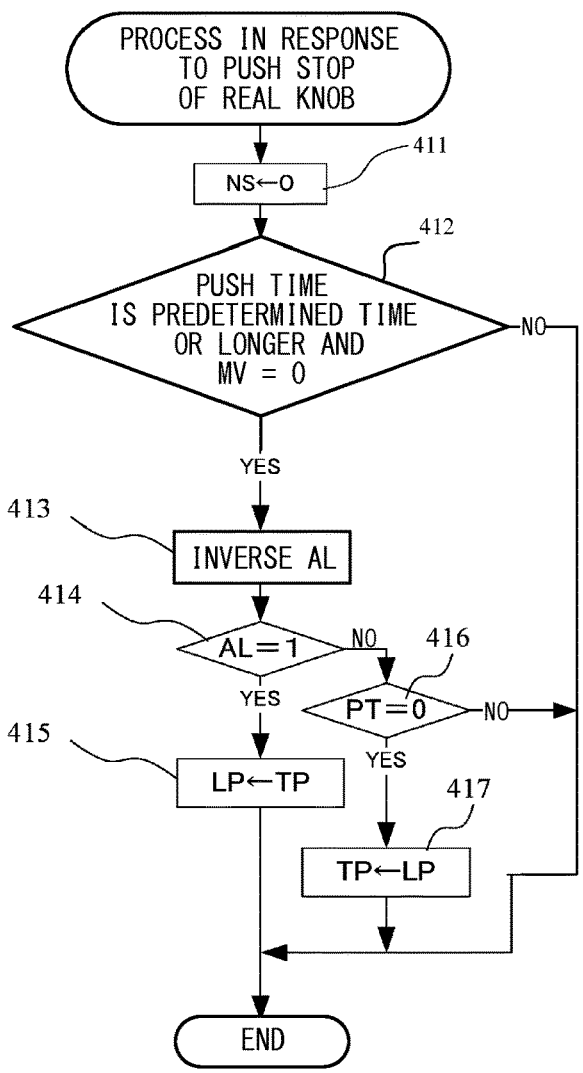

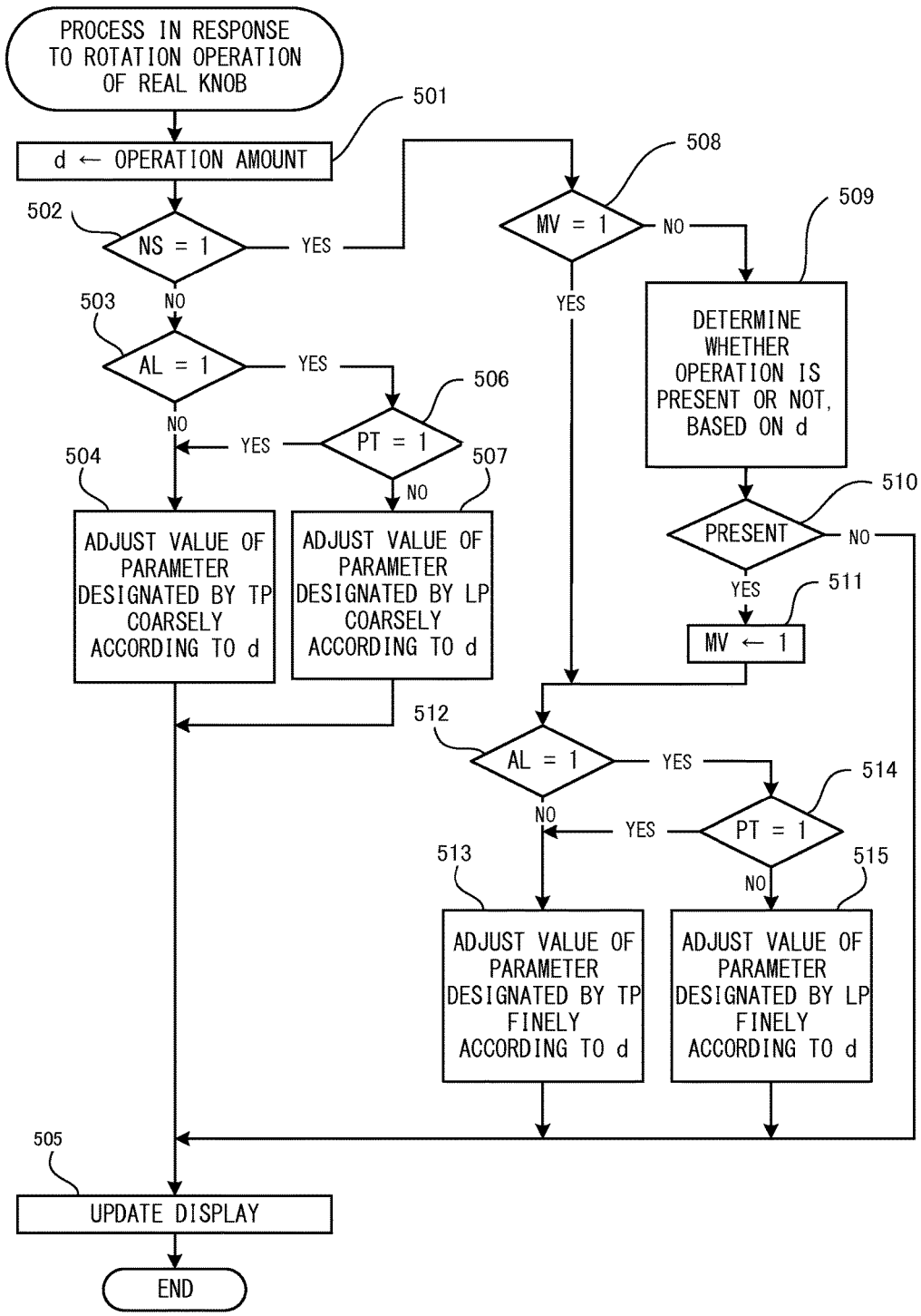
{Fig.5}

{Fig. 6A}
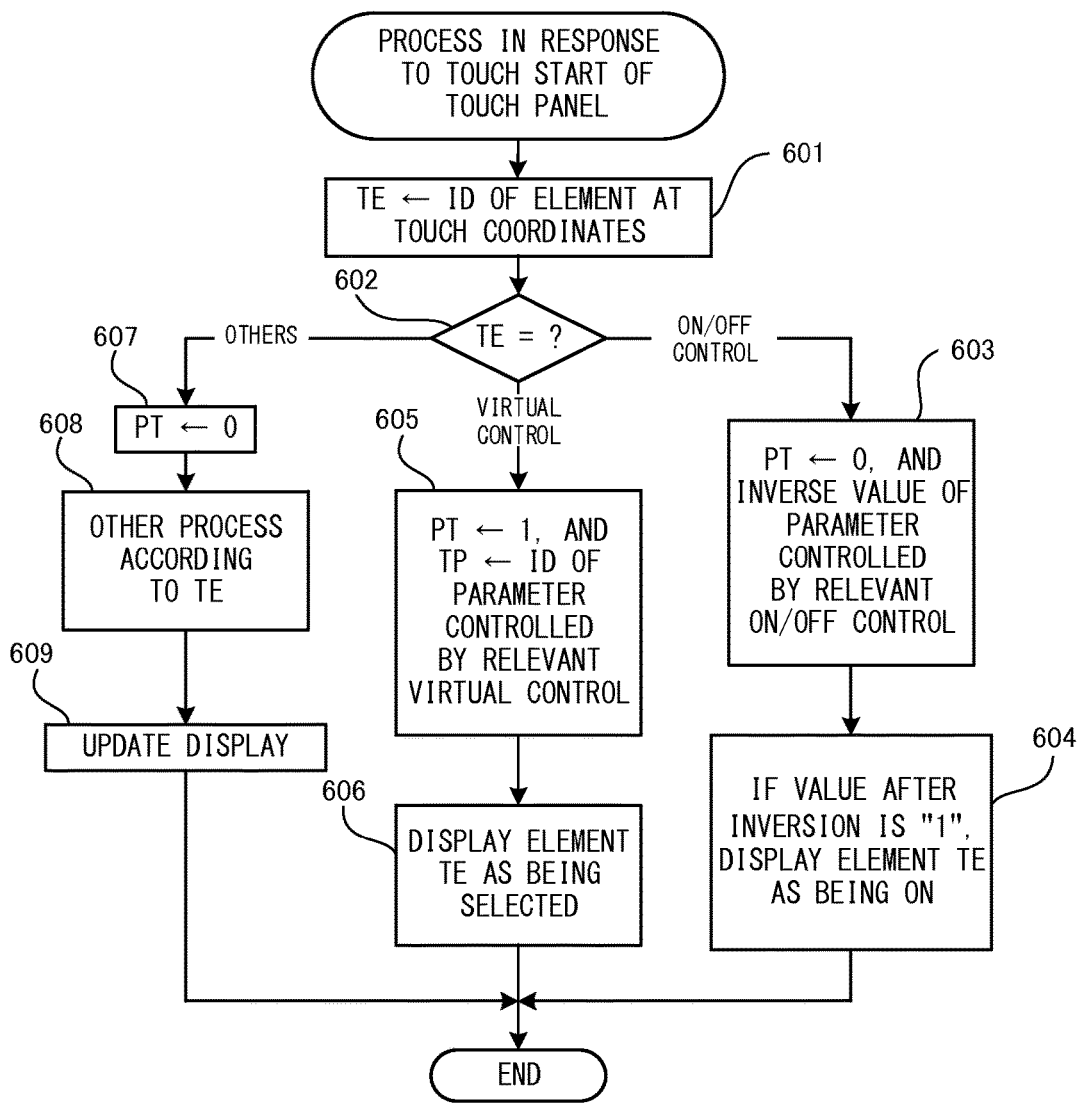

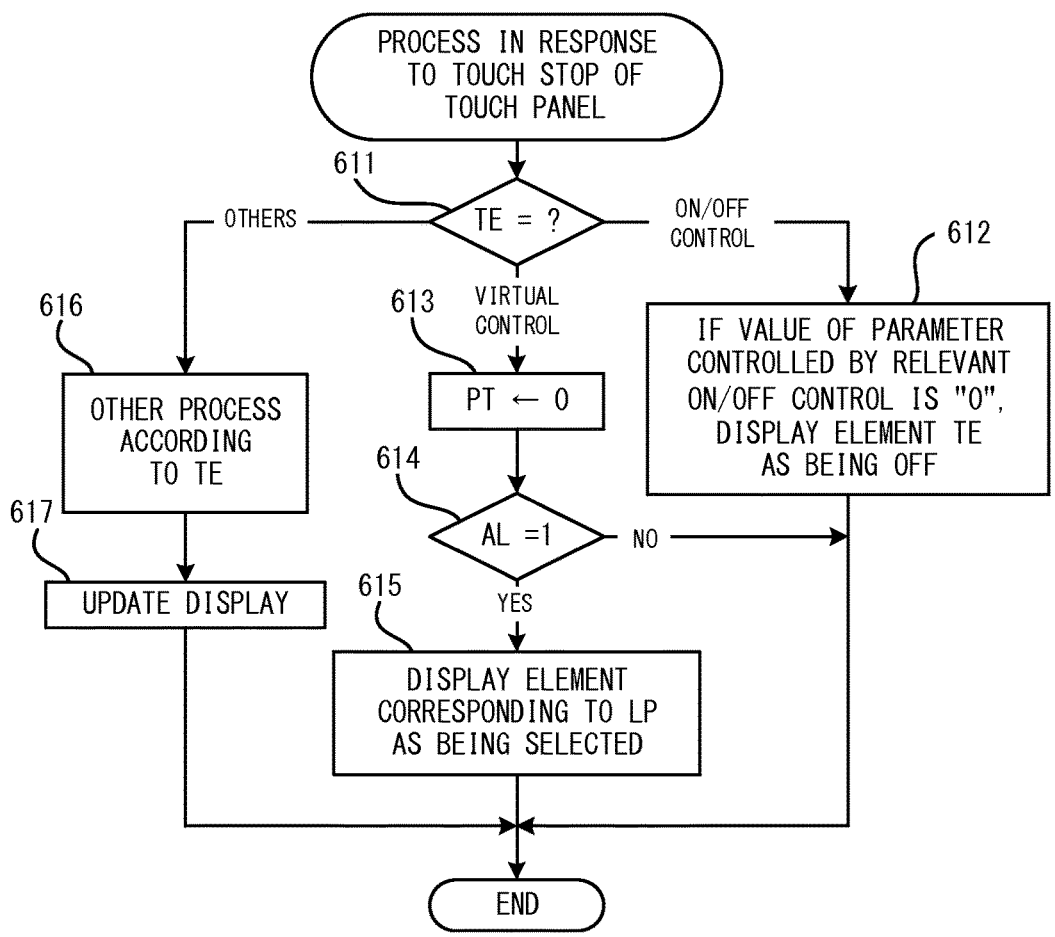

PARAMETER SETTING APPARATUS, AUDIO SIGNAL PROCESSING APPARATUS, PARAMETER SETTING METHOD AND STORAGE MEDIUM

TECHNICAL FIELD

The invention relates to a parameter setting apparatus and parameter setting method applied to a digital mixer and the like, an audio signal processing apparatus comprising the parameter setting apparatus, and a storage medium containing program instructions enabling a computer to perform such a parameter setting method.

BACKGROUND ART

A digital mixer having a touch and turn function has been conventionally known (refer to NPL1). The touch and turn function is a function to display a plurality of virtual knobs to which various kinds of parameters have been already assigned, on a display screen of a display device adapted to detect touch operation by a user, and in response to touch to one of the virtual knobs by a user's finger, assign the parameter of the touched virtual knob to a touch and turn real knob provided on an operation panel, and modify a value of the assigned parameter according to operation of the touch and turn real knob.

Further, in an apparatus provided with a function of assigning a parameter to a real knob (similar to the touch and turn function), a function of locking the assignment has also been known (refer to NPL2). This apparatus is structured such that a lock button is provided near a real knob in an audio interface apparatus in which a parameter of a virtual knob, among virtual knobs on a screen, pointed by a mouse pointer is assigned to the real knob and the value of the assigned parameter is incremented and decremented according to operation of the real knob. When a user turns on the lock button after placing the mouse pointer on one of the virtual knobs, the assignment of the parameter of the virtual knob to the real knob at the time of the turning on is locked (fixed). While the assignment is locked, the assignment of the parameter to the real knob is not changed even when the user moves the mouse pointer to another virtual knob. When the user turns off the lock button, the assignment is unlocked, and the original operation (that is, the operation in which a parameter of a virtual knob pointed by the mouse pointer is assigned to the real knob) is restored.

CITATION LIST

{Non Patent Literature}
{NPL1} DIGITAL MIXING CONSOLE QL5/QL1 Owner's Manual, Yamaha Corporation, 2014 (refer to the explanation on [TOUCH AND TURN] knob)
{NPL2} USB AUDIO INTERFACE CI2+ Operation Manual, Steinberg, 2010 (refer to the explanation on [LOCK] button in AI KNOB section)

SUMMARY OF INVENTION

Using the aforesaid touch and turn function and lock function makes it possible to easily assign various kinds of parameters to one real knob, and modify values of the parameters using the one real knob. Further, it is possible to lock the assignment of one parameter to the real knob and conveniently use the real knob as a control for the parameter. However, as digital mixers come to have higher functions, the kind and number of parameters are increasing. Accordingly, it is required to modify values of more parameters while easily switching a target of the modification using a real knob on the operation panel.

In particular, the lock function is basically to lock the assignment of one desired parameter to the real knob and use the real knob exclusively for the parameter. However, in some case, it is desired to temporarily modify a different parameter using the real knob. In this case, the conventional method requires the following operation. That is, the assignment to the real knob is first unlocked, and after the operation to assign the different parameter to the real knob is performed, the different parameter is modified by using the real knob, and then the operation to assign the original parameter to the real knob is performed again, and further the operation to lock the assignment is performed. This has a problem that the operation is complicated and in addition takes a long time.

It is an object of the present invention to provide, in an apparatus having a function, similar to a touch and turn function, of assigning parameters to a real control and a function of locking the assignment, a parameter setting technique that makes it possible to temporarily change the assignment of a parameter to the real control by simple operation even when the assignment is locked, thereby enabling to modify a different parameter by using the real control, and also makes it possible to restore the original lock state from the temporary assignment by simple operation.

{Solution to Problem}

To attain the above object, a parameter setting apparatus of the invention is a parameter setting apparatus including: a real control adapted to detect modification operation by a user on the real control for modifying a value of a parameter; a selector adapted to select one of lock state and unlock state; a display device adapted to display virtual controls respectively corresponding to parameters and detect a touch by the user on any of the virtual controls; an assigner adapted to assign, when the touch on one of the virtual controls is detected in the unlock state, the parameter corresponding to the touched virtual control to the real control, and to keep the assignment of the parameter to the real control even when the touch on one of the virtual controls is detected in the lock state; a modifier adapted to modify a value of the parameter assigned to the real control in response to the modification operation while the touch on none of the virtual controls is detected, and modify, while the touch on one of the virtual controls is detected, a value of the parameter corresponding to the touched virtual control in response to the modification operation.

{Advantageous Effects of Invention}

According to the present invention, in an apparatus having a function, similar to a touch and turn function, of assigning parameters to a real control and a function of locking the assignment, even when the assignment of a parameter to the real control is locked, it is possible to temporarily change a parameter to be a target of modification by simple operation and modify a different parameter by using the real control.

BRIEF DESCRIPTION OF DRAWINGS

FIG. 1 is a diagram illustrating a hardware configuration of a digital mixer being one embodiment to which the invention is applied.
FIG. 2 is a partial exterior view of an operation panel.
FIG. 3 is a view illustrating a channel control screen.

FIG. 4A is a flowchart of a process in response to push operation of a real knob.

FIG. 4B is a flowchart of a process in response to push stop operation of the real knob.

FIG. 5 is a flow chart of a process in response to rotation operation of the real knob.

FIG. 6A is a flowchart of a process in response to touch start of a touch panel.

FIG. 6B is a flowchart of a process in response to touch stop of a touch panel.

DESCRIPTION OF EMBODIMENTS

Hereinafter, an embodiment of the present invention will be described using the drawings.

FIG. 1 is a block diagram illustrating a hardware configuration of a digital mixer being one embodiment to which the present invention is applied. A central processing unit (CPU) 101 is a processing unit which controls the whole operation of the digital mixer. A flash memory 102 is a nonvolatile memory storing various kinds of programs executed by the CPU 101, various data, and so on. A random access memory (RAM) 103 is a volatile memory used as a load area and a work area of the programs executed by the CPU 101. In the flash memory 102 or the RAM 103, a memory area called a current memory is provided, and the CPU 101 controls the operation of a later-described signal processing unit 109 based on values of various kinds of parameters stored in the current memory. A moving fader 104 is a control for level setting provided on an operation panel of the digital mixer. An I/O (input/output interface) 105 for PC is an interface for connection to PC (personal computer).

A display device 106 is a display provided on the operation panel to display various kinds of information, and is a touch panel adapted to detect touch operation by a user. Controls 107 are various kinds of controls provided on the operation panel to be operated by a user (rotary encoders, switches, buttons, and so on other than the moving fader 104). A waveform I/O (audio signal input and output interface) 108 is an interface for exchange of audio signals with an external device. The signal processing unit (DSP) 109 performs a mixing process, an effect applying process, a volume level control process, and so on of audio signals inputted via the waveform I/O 108 by executing various kinds of microprograms based on instructions by the CPU 101, and outputs the processed audio signals via the waveform I/O 108. A bus 110 is a bus line connecting these parts and is a general term for a control bus, a data bus, and an address bus. Note that "signal" described in this specification refers to an audio signal unless otherwise specified (unless it is described as being a control signal).

FIG. 2 illustrates a part of an exterior of the operation panel of the digital mixer of this embodiment. On the operation panel, various kinds of controls are disposed together with a touch panel 201 (display device 106 in FIG. 1). 202 denotes a real knob (rotary encoder) for touch and turn function which is provided with a push button (knob switch). When a user performs push operation of the real knob 202 with his/her finger, the knob switch turns on, and when the finger is taken off, the pushed knob automatically returns, so that the knob switch turns off.

FIG. 3 illustrates an example of a channel control screen displayed on the touch panel 201. The screen 301 is an example of a screen displayed when the user selects an equalizer of the first input channel as a target of operation. In the screen 301, a plurality of virtual knobs 302, 303, . . . for setting parameters of the equalizer of the first input channel which is the target of the operation is displayed. Each virtual knob in screens, not limited to the screen 301, displayed on the touch panel indicates a value of one corresponding parameter. In the touch and turn function, when any of the virtual knobs is selected by being touched, the parameter of the virtual knob is selected as a target of modification using the real knob.

Several modes how the parameter modification using the real knob 202 is executed in this embodiment in a state where the screen 301 in FIG. 3 is displayed on the touch panel 201 will be described.

The real knob 202 of the mixer of this embodiment has the touch and turn function similar to that of the conventional art. For example, when the user touches the virtual knob 302 on the screen 301 with his/her finger, the virtual knob 302 comes into a selected state, and the value of the parameter corresponding to the virtual knob 302 can be modified by using the real knob 202. On the screen, the virtual knob 302 in the selected state is highlighted by, for example, inverse display for easier recognition. Even when the finger is taken off the virtual knob 302 after touching it, the virtual knob 302 is kept selected, and therefore the value of the parameter corresponding to the virtual knob 302 can be continuously modified by using the real knob 202. Touching the virtual knob 303 in the state where the virtual knob 302 is selected brings the virtual knob 303 into the selected state, and the value of the parameter corresponding to the virtual knob 303 can be modified by using the real knob 202. Note that the virtual knobs are an example, and controls on the screen touched by the user may be any controls that can indicate and modify continuously changing values of the parameters, such as virtual faders, graphs, or text boxes. In this specification, these controls are called "virtual controls".

Further, as in the conventional art, the real knob 302 has a function of finely adjusting, in response to rotation along with its push operation, a value of a parameter that is selected as a target of the modification, with finer resolution than normally. For example, when the user performs the rotation operation of the real knob 202 without performing its push operation in a state where the parameter corresponding to the virtual knob 302 is assigned to the real knob 202, the value of the parameter is modified with normal resolution (here, referred to as "coarse adjustment") according to an amount of the rotation. On the other hand, when the user performs the rotation operation of the real knob 202 along with its push operation, the value pf the parameter is modified with finer resolution than normally (here, referred to as "fine adjustment") according to the amount of the rotation.

The lock function relating to the real knob 202 will be described. When the user pushes the real knob 202 long (push operation for a predetermined time or longer) without performing its rotation operation in a state where any of the virtual knobs, for example, the virtual knob 302, is in the selected state, the assignment of the parameter corresponding to the virtual knob 302 which has been assigned to the real knob 202 at this instant is locked, and even if a different virtual knob (for example, 303) is touched thereafter, the value of the parameter corresponding to the virtual knob 302 which has been assigned at the time when the assignment is locked (hereinafter, called a lock-time parameter) is continuously modified by using the real knob 202. Here, the above-described function of adjusting the value of the parameter finely by the rotation operation of the real knob 202 along with its push operation is given a priority over the lock function. That is, even if the real knob 202 is pushed long, this is not determined as a lock instruction when the rotation operation is performed during the long push. Only when the push operation is stopped without the rotation operation being performed during the long push, this is determined as the lock instruction (not as the fine adjustment).

Similarly, in the lock state as well, when the user performs the rotation operation of the real knob 202 without its push operation, the value of the lock-time parameter is adjusted coarsely, and when the user performs the rotation operation of the real knob 202 along with its push operation, the value of the lock-time parameter is adjusted finely. In this case as well, when the user stops the push operation without performing the rotation operation during the long push, this is determined as a later-described unlock instruction (not the fine adjustment).

When the user, after locking the assignment by the long push of the real knob 202 without its rotation operation, performs the long push operation of the real knob 202 again without performing its rotation operation, the assignment is unlocked. When the rotation operation of the real knob 202 is performed during its long push operation, the assignment is not locked nor unlocked, and the value of the parameter that is assigned to the real knob 202 at this instant is adjusted finely according to an amount of the rotation operation.

Next, a function of temporarily switching a parameter selected as a target of the modification using the real knob 202 will be described. In this digital mixer, even in the lock state, while the user touches a virtual knob different from the virtual knob whose assignment is locked, a value of a parameter corresponding to the touched virtual knob is temporarily modified by using the real knob 202. For example, when the user touches the virtual knob 303 while the assignment of the parameter corresponding to the virtual knob 302 to the real knob 202 is locked, the virtual knob 303 comes into the selected state on the screen only while this touch continues, so that the parameter corresponding to the virtual knob 303 is temporarily assigned to the real knob 202. Therefore, by performing the rotation operation of the real knob 202 while the touch continues, the value of the parameter corresponding to the virtual knob 303 is modified. Further, when the rotation operation of the real knob 202 is performed along with its push operation, the value of the parameter corresponding to the virtual knob 303 is adjusted finely.

Incidentally, in order for the above-described function of temporarily switching the parameter selected as a target of the modification to work, it is necessary to operate the real knob 202 while continuously touching the virtual knob. For example, when the user touches the virtual knob 303 with his/her finger while the assignment of the parameter corresponding to the virtual knob 302 to the real knob 202 is locked, the virtual knob 303 comes into the selected state, but when the finger is taken off thereafter, the selected state of the virtual knob 303 is canceled and the virtual knob 302 returns to the selected state, and therefore, when the user performs the rotation operation of the real knob 202 at this instant, the value of the parameter corresponding to the virtual knob 302 is modified.

Further, in the above, the description is given, taking the virtual knobs on the screen as an example, but as described above, the virtual knobs are an example of the virtual controls, and the same function can be realized also in a case where the virtual controls displayed on the screen are virtual faders, text boxes in which numeric values are indicated, or the like. In a description of the following flow charts, more generalized term "virtual control" is used instead of "virtual knob".

Here, variables used by the CPU 101 of the mixer of this embodiment will be described. Incidentally, it is assumed that the following variables are provided on the RAM 103, and signs of the variables respectively indicate a memory area on the RAM 103 to which the variable is assigned and also indicate information itself stored in the memory area.

(1) NS: Knob switch flag. Its value is set at "1" while the push operation of the real knob 202 is performed, and is set at "0" while the push operation is not performed.

(2) MV: Move flag. Its value is set at "0" when the push operation of the real knob 202 is performed, and is changed to "1" when it is thereafter determined that the rotation operation of the real knob 202 is performed while its push operation is performed.

(3) AL: Assign lock flag. Its value is set at "1" when the real knob 202 is in the lock state, and is set at "0" when it is in an unlock state (lock release state).

(4) TE: Touch element. Display elements displayed on the touch panel 201 are given in advance IDs identifying the display elements, and a value of ID identifying a display element touched by the user is set in TE. The display elements include, besides the virtual controls for setting the values of the parameters such as the virtual knobs (302 and 303 in FIG. 3, and so on) and the virtual faders, on/off controls, panes corresponding to backgrounds of these controls, and so on.

(5) PT: Parameter touch flag. Its value is set at "1" while any of the virtual controls displayed on the touch panel 201 is touched, and is set at "0" while any of the virtual controls is not operated.

(6) TP: Touch parameter. A parameter ID identifying a parameter selected by touch is set. Whether the assignment is locked or not, when the user touches any of the virtual controls on the screen, the parameter ID corresponding to the touched virtual control is set in TP. Even if a display element other than the virtual controls is touched, the value of TP is not changed.

(7) LP: Lock parameter. When the assignment of a parameter of any of the virtual controls to the real knob 202 is locked, ID of the parameter relating to the lock is recorded in LP to indicate which of the parameters was being assigned at the time of the lock. That is, ID of the parameter that was being assigned to the real knob 202 at an instant when the assignment is locked is set in LP.

FIG. 4A is a flowchart illustrating a process executed by the CPU 101 in response to the push operation of the real knob 202. When it is detected that the push switch of the real knob 202 is turned on by the user, this process is executed. At step 401, the CPU 101 sets "1" to the knob switch flag NS, and sets "0" to the move flag MV.

FIG. 4B is a flowchart illustrating a flow of a process executed by the CPU 101 in response to push stop operation of the real knob 202. When it is detected that the push switch of the real knob 202 is turned off by the user, this process is executed.

At step 411, the CPU 101 sets "0" to the knob switch flag NS. At step 412, the CPU 101 determines whether or not duration of the push operation is a predetermined time or longer (long push) and the move flag MV=0 (the rotation operation is not performed). If the determination result is false, that is, if the push time is not the predetermined time or longer or if MV=1 (if the push time is the predetermined time or longer but the rotation operation is performed during this time), the process is ended here.

If the determination result at step 412 is true, the CPU 101 inverses the value of the assign lock flag AL at step 413. This means that, if the current state is the lock state (AL=1), the state is shifted to the unlock state (AL=0), and if the current state is the unlock state (AL=0), the state is shifted to the lock state (AL=1). At step 414, it is determined whether AL=1 or not. If AL=1, since this means that the lock state is started, the CPU 101 sets the value of the touch parameter TP at the current moment to the lock parameter LP at step 415. If AL=1 is not true at step 414, since this means that the assignment is unlocked, the CPU 101 determines at step 416 whether PT=0 or not. If the parameter touch PT=1, the process is ended here, and if PT=0, the CPU 101 sets the value of the lock parameter LP at the current moment to the touch parameter TP and ends the process. In this example, in the unlock state, the parameter designated by the touch parameter TP is a target parameter of value modification using the real knob 202. Here, in consideration of continuity of the operation by the user, when any of the virtual controls on the touch panel 201 is touched at this instant, the target parameter is a parameter designated by TP, and when no virtual controls are touched, the target parameter is the parameter designated by LP. That is, only in the case of PT=0, the value of the lock parameter LP is copied to the touch parameter TP.

FIG. 5 is a flowchart illustrating a flow of a process executed by the CPU 101 in response to the rotation operation of the real knob 202. This process is executed when the rotation operation of the real knob 202 by the user is detected.

At step 501, the CPU 101 sets an operation amount of the detected rotation operation of the real knob 202 to a work register d. Subsequently, the coarse adjustment of a parameter value from steps 503 to 507 is executed according to the operation amount d. First, the CPU 101 determines at step 502 whether or not NS=1. If NS=1 is not true, the CPU 101 determines at step 503 whether or not AL=1. If AL=1 is not true at step 503, the process goes to step 504. If Al=1 at step 503, the CPU 101 determines at step 506 whether or not PT=1. If PT=1, the process goes to step 504, and if not, the process goes to step 507.

It is when the push operation of the real knob 202 is not performed and the assignment is not locked that the process goes to step 504 after going through 502, 503, and at step 504, the CPU 101 adjusts the value of the parameter designated by the touch parameter TP coarsely according to the operation amount d. It is when the push operation of the real knob 202 is not performed and any of the virtual controls is touched on the touch panel though the assignment is locked that the process goes to step 504 after going through 502, 503, and 506. In this case, since the parameter corresponding to the currently touched virtual control is temporarily (with a higher priority over the locked parameter) selected as the target of the modification, the process also goes to step 504, where the CPU 101 adjusts the value of the parameter designated by the touch parameter TP coarsely according to the operation amount d. Note that the adjustment of the value of the parameter means that a value stored in an area for the parameter on the current memory is modified. The CPU 101 constantly controls signal processing in the signal processing unit 109 based on values of various kinds of the parameters on the current memory, and the adjusted value of the parameter is reflected in the signal processing immediately. After step 504, the CPU 101 updates display of the corresponding virtual control to indicate the adjusted value of the parameter at step 505, and ends the process. Incidentally, examples of the update are to move a knob/fader position of the virtual knob or virtual fader to a position corresponding to the adjusted value of the parameter or to indicate the adjusted value of the parameter in the text box.

It is when the push operation of the real knob 202 is not performed, the assignment is locked, and none of the virtual controls is touched on the touch panel that the process goes to step 507 after going through 502, 503, and 506. In this case, since the currently locked parameter is selected as a target of the modification, the process goes to step 507. At step 507, the CPU 101 adjusts the value of the parameter designated by the lock parameter LP coarsely according to the operation amount d. Thereafter, the process goes to step 505, where the CPU 101 updates display of the corresponding virtual control to indicate the adjusted value, and then the process is ended.

If NS=1 at step 502, the CPU 101 determines at step 508 whether or not MV=1. If MV=1, the process goes to step 512. When MV=1 is not true, the process goes to step 509. It is when the push operation of the real knob 202 is being performed and it has not been determined yet that its rotation operation is performed after the start of the push operation that the process goes to step 509 after going through 502, and 508. In this case, the CPU 101 determines at step 509 whether or not the rotation operation is present, based on a change history of the operation amount d, and confirms the determination result at step 510. When "the rotation operation is present", the CPU 101 sets "1" to MV at step 511, and the process goes to step 512. On the other hand, when "the rotation operation is not present" at step 510, the process goes to step 505. The process in FIG. 5 is activated even in response to a minute rotation operation.

When the user performs the push operation of the real knob 202, the real knob 202 rotates slightly even if the rotation operation is not intended. Steps 509 to 511 are processes for determining that "the rotation operation is not present" when the process in FIG. 5 is activated in response to such unintentional rotation during the push operation. Specifically, only when the rotation operation by a predetermined amount or more is continuously detected, the operation of the real knob 202 is regarded as an intentional operation, and the process goes to step 512. When the rotation operation is rotation only by a delicate amount, it is determined that "the rotation operation is not present" at step 510, and the process goes to step 505, and the modification of the parameter is not performed. Therefore, since the value of none of the parameters changes, the process is ended without the update at step 505 being performed.

As described above, when, (during the push operation), it is determined at step 509 that "the rotation operation is present", the process by the CPU 101 goes to step 512. However, "1" is set to MV at this time, and therefore, when the process in FIG. 5 is further activated (during this push operation), the process by the CPU 101 also goes to step 512 after going through 502, 503. Processes from steps 512 to 515 are processes to adjust the value of the parameter finely according to the operation amount d. That is, when it is determined once at step 509 during the push operation that "the rotation operation is present", the fine adjustment processes from steps 512 to 515 are performed in the subsequent processes in FIG. 5 even if the activation factor is rotation operation only by a delicate amount. The CPU 101 determines at step 512 whether or not AL=1. The process goes to step 513 if AL=1 is not true, and goes to step 514 if AL=1. At step 514, the CPU 101 determines whether or not PT=1. If PT=1, the process goes to step 513, and if not, goes to step 515.

It is when the push operation of the real knob 202 is performed and the assignment is not locked that the process goes to step 513 after going through 512. At step 513, the CPU 101 adjusts the value of the parameter designated by the touch parameter TP finely according to the operation amount d. It is when the push operation of the real knob 202 is performed and any of the virtual controls is touched on the touch panel though the assignment is locked that the process goes to step 513 after going through 512, and 514. In this case, the parameter corresponding to the currently touched virtual control is temporarily selected as a target of the modification (with a higher priority over the locked parameter), and therefore the process also goes to step 513, where the CPU 101 adjusts the value of the parameter designated by the touch parameter TP finely according to the operation amount d. Thereafter, the process goes to step 505, where the CPU 101 updates display of the corresponding virtual control to indicate the adjusted value, and ends the process.

It is when the push operation of the real knob 202 is performed, the assignment is locked, and none of the virtual controls is touched on the touch panel that the process goes to step 515 after going through 512, and 514. In this case, since the currently locked parameter is selected as a target of the modification, the process goes to step 515. At step 515, the CPU 101 adjusts the value of the parameter designated by the lock parameter LP finely according to the operation amount d. Thereafter, the process goes to step 505, where the CPU 101 updates display of the corresponding virtual control to indicate the adjusted value, and then ends the process.

FIG. 6A is a flowchart illustrating the procedure of a process executed by the CPU 101 in response to touch start of the touch panel 201. This process is executed when the user touches somewhere on the screen of the touch panel 202 with his/her finger, irrespective of whether the assignment is locked or not.

At step 601, the CPU 101 sets ID of a display element present at the touch coordinates, to the touch element TE. At step 602, the CPU 101 discriminates the kind of the display element designated by TE. When the touched element is an on/off control, the CPU 101 at step 603 sets "0" to PT and inverses a value of a parameter that is to be modified by using the touched on/off control ("1" indicates "on" and "0" indicates "off"). Specifically, the CPU 101 changes the value of the parameter to "0" indicating "off" when it is "1" indicating "on", and changes it to "1" when it is "0". Next, at step 604, the CPU 101 displays the display element TE as being "on" when the value after the inversion is on "1" indicating "on", and ends the process. When the touched element is a virtual control at step 602, the CPU 101 at step 605 sets "1" to PT, and sets ID of a parameter corresponding to the virtual control, to the touch parameter TP. Further, at step 606, the CPU 101 displays the display element (the virtual control) designated by the touch element TE as being selected, and if another virtual control is being displayed as being selected, the CPU 101 changes this display to a non-selected state, and ends the process. When the touched element is of another kind at step 602, the CPU 101 sets "0" to PT at step 607, executes another process according to the kind designated by TE at step 608, updates display of the display element designated by TE at step 609, and ends the process.

FIG. 6B illustrates a flow of a process executed by the CPU 101 in response to touch stop operation of the touch panel 201. This process is executed when the touching finger of the user is taken off the screen of the touch panel 201 (that is, when the touch is released), irrespective of whether the assignment is locked or not.

At step 611, the CPU 101 discriminates what kind of display element is indicated by ID set in the touch element TE at this instant, that is, of what kind the touch release is. When the touch release is release from the on/off control, the CPU 101 displays the display element indicated by the touch element TE as being "off" at step 612 if the value of the parameter corresponding to the on/off control designated by TE is "0" indicating "off", and ends the process. When the touch release is release from the virtual control at Step 611, the CPU 101 sets "0" to PT at step 613, and determines at step 614 whether or not AL=1. If AL=1, this means that any of the virtual controls is touched while the assignment is locked and the touch is released after a parameter corresponding to the touched virtual control is temporarily selected as a target of the modification using the real knob 202, and since the target of the modification using the real knob 202 is thereafter returned to the parameter designated by the lock parameter LP (before the temporary modification), the CPU 101 at step 615 returns the display of the display element designated by the touch element TE from the selected state to the non-selected state, and also changes display of the display element of the virtual control corresponding to the parameter designated by the lock parameter LP to the selected state, and then ends the process. If AL=1 is not true at step 614, this means that any of the elements is touched while the assignment is unlocked and thereafter the touch is released, and thus the target of the modification using the real knob 202 does not change, and therefore, the CPU 101 ends the process here without changing the selected state of the display element of the virtual control. If the touch release is of another kind at step 611, the CPU 101 at step 616 executes another process according to the kind designated by TE, and at step 617 updates display, and then ends the process.

According to the above-described embodiment, even though the assignment of any one parameter to the real knob is locked, if a user touches a desired virtual control displayed on the touch panel, a parameter corresponding to the touched virtual control is temporarily assigned to the real control with ease. Then, only by stopping the touch to the virtual control, the locked assignment of the original parameter is restored. Thus, the user can easily perform the temporary assignment and the restoration to the lock state.

Further, according to the above-described embodiment, it is also possible to restore the original lock state from the temporarily changed state by simple operation. Especially in an apparatus which uses a real control adapted to accept push operation and locks and unlocks the assignment by long push in response to a long push of the real control, as in the embodiment, it takes a very long time to lock and unlock the assignment. In this case as well, even in the lock state, only by touching a display element, it is possible to temporarily change a parameter to be a target of the modification, and only by stopping the touch operation, the original lock state is restored, which has an effect of eliminating a need for the lock and unlock operation which takes a very long time.

In the above-described embodiment, the example where an instruction to lock and unlock the assignment is given by holding the on state of the real control for a predetermined time or longer (long push of the real control) is described, but the invention is applicable to an apparatus with a lock button dedicated to lock or unlock the assignment. Further, in this embodiment, a parameter is adjusted finely when the real knob is pushed and rotated, but the invention of the present application is also applicable to a parameter setting apparatus not having such a fine adjustment function.

Incidentally, in the above-described embodiment, a display element that is firstly touched (a display element at a touch start position) when the touch panel is touched is set as a target of processing, and even if the finger is thereafter moved to another display element while keeping the touch on the first touched display element (so-called drag operation is performed), a target of the processing is not changed to the another display element. However, this can be changed so that the display element at which the finger is taken off (a display element at a touch stop position) is selected as a target of the processing when the drag operation is performed.

Further, in the above-described embodiment, the long push of the real knob is discriminated based on the push time when the the push operation of the real knob is stopped, but also adoptable is a method in which the continuation time of the push operation from the start of the push operation of the real knob is measured, and when the measured time becomes a predetermined time or longer, this operation is determined as the long push.

REFERENCE SIGNS LIST

101 . . . central processing unit (CPU), 102 . . . flash memory, 103 . . . RAM, 104 . . . moving fader, 106 . . . display device, 107 . . . controls, 108 . . . waveform I/O, 109 . . . signal processing unit

The invention claimed is:

1. A parameter setting apparatus comprising:
a real control adapted to detect modification operations by a user on the real control for modifying values of parameters;
a display device adapted to display virtual controls respectively corresponding to parameters and detect touches by the user on any of the virtual controls;
a processor adapted to:
select one from a group comprising a lock state and an unlock state,
assign, when a touch on a first virtual control of the virtual controls is detected in the unlock state, a first parameter corresponding to the touched first virtual control to the real control,
keep the assignment of the first parameter to the real control even when a touch on a second virtual control of the virtual controls is detected in the lock state,
modify a value of the first parameter assigned to the real control in response to a first modification operation on the real control while no touch on the virtual controls is detected, and
modify, while the first parameter other than a second parameter is assigned to the real control and the touch on the second virtual control of the virtual controls is detected in the lock state, a value of the second parameter corresponding to the touched second virtual control in response to a second modification operation on the real control.

2. The parameter setting apparatus according to claim 1, wherein the display device is adapted to detect a touch performed on a virtual control at a touch start position.

3. The parameter setting apparatus according to claim 1, wherein the display device is adapted to detect a touch performed on a virtual control at a touch stop position when a drag operation is performed.

4. The parameter setting apparatus according to claim 1, wherein the real control is a rotary encoder.

5. The parameter setting apparatus according to claim 1, wherein values of the parameters corresponding to the virtual controls are continuously changing values, and the processor is adapted to modify a value of a parameter by increasing or decreasing its value according to a detected modification operation on the real control.

6. The parameter setting apparatus according to claim 1, wherein the real control is adapted to be turned on into an on state and turned off into an off state by the user, and the processor is adapted to select the lock state when the real control is kept in the on state for a predetermined amount of time or longer while in the unlock state, and select the unlock state when the real control is kept in the on state for a predetermined amount of time or longer while in the lock state.

7. The parameter setting apparatus according to claim 6, wherein the processor is adapted to modify a value of a parameter coarsely when a modification operation is performed while the real control is in the off state, and modify the value of the parameter finely when a modification operation is performed while the real control is in the on state, irrespective of whether the processor selects the lock state or the unlock state.

8. The parameter setting apparatus according to claim 7, wherein the processor is adapted to keep, when a modification operation is performed while the real control is in the on state and then it is detected that the on state is kept for a predetermined amount of time or longer, the selection of the lock state or the unlock state at that instant.

9. The parameter setting apparatus according to claim 1, further comprising a selection switch,
wherein the processor is adapted to select one from a group comprising the lock state and the unlock state according to an operation on the selection switch by the user.

10. An audio signal processing device comprising:
a signal processor adapted to process an audio signal based on values of parameters; and
the parameter setting apparatus according to claim 1 adapted to modify the values of the parameters utilized by the signal processor.

11. A parameter setting method comprising:
detecting modification operations by a user on a real control for modifying values of parameters;
selecting one from among a group comprising a lock state and an unlock state;
displaying, on a display device, virtual controls respectively corresponding to parameters;
detecting touches by the user on any of the virtual controls;
assigning, when a touch on a first virtual control of the virtual controls is detected in the unlock state, a first parameter corresponding to the touched first virtual control to the real control;
keeping the assignment of the first parameter to the real control even when a touch on a second virtual control of the virtual controls is detected in the lock state;
modifying a value of the first parameter assigned to the real control in response to a first modification operation on the real control while no touch on the virtual controls is detected; and
modifying, while the first parameter other than a second parameter is assigned to the real control and the touch on the second virtual control of the virtual controls is detected in the lock state, a value of the second parameter corresponding to the touched second virtual control in response to a second modification operation on the real control.

12. A non-transitory machine-readable storage medium containing program instructions, executable by a computer, that, when executed, enable the computer to execute a method comprising:

detecting modification operations by a user on a real control for modifying values of parameters;

selecting one from among a group comprising a lock state and an unlock state;

displaying, on a display device, virtual controls respectively corresponding to parameters detecting touches by the user on any of the virtual controls;

assigning, when a touch on a first virtual control of the virtual controls is detected in the unlock state, a first parameter corresponding to the touched first virtual control to the real control;

keeping the assignment of the first parameter to the real control even when a touch on a second virtual control of the virtual controls is detected in the lock state;

modifying a value of the first parameter assigned to the real control in response to a first modification operation on the real control while no touch on the virtual controls is detected; and modifying, while the first parameter other than a second parameter is assigned to the real control and the touch on the second virtual control of the virtual controls is detected in the lock state, a value of the second parameter corresponding to the touched second virtual control in response to a second modification operation on the real control.

* * * * *